United States Patent
Fergusson et al.

(10) Patent No.: US 10,780,678 B2
(45) Date of Patent: Sep. 22, 2020

(54) COMPOSITE SANDWICH STRUCTURE

(71) Applicant: Fergusson's Advanced Composite Technology Limited, London, Greater London (GB)

(72) Inventors: Alexander Douglas Fergusson, London (GB); Alexander George Newman, London (GB); Adam Paul Leon Mayall, London (GB); Teodor Boykov Balev, London (GB); Jonathan Philip Casey, London (GB); Tong Wang, London (GB); Marc-Antoine Lormel Di Guisto, London (GB)

(73) Assignee: Fergusson's Advanced Composite Technology Limited, London, Greater London (GB)

( * ) Notice: Subject to any disclaimer, the term of this patent is extended or adjusted under 35 U.S.C. 154(b) by 0 days.

(21) Appl. No.: 15/580,758

(22) PCT Filed: Jun. 10, 2016

(86) PCT No.: PCT/GB2016/051718
§ 371 (c)(1),
(2) Date: Dec. 8, 2017

(87) PCT Pub. No.: WO2016/198884
PCT Pub. Date: Dec. 15, 2016

(65) Prior Publication Data
US 2018/0297339 A1    Oct. 18, 2018

(30) Foreign Application Priority Data

Jun. 10, 2015 (GB) .................................. 1510082

(51) Int. Cl.
*B32B 27/12* (2006.01)
*B32B 27/08* (2006.01)
(Continued)

(52) U.S. Cl.
CPC .............. *B32B 27/12* (2013.01); *B29C 70/66* (2013.01); *B32B 3/12* (2013.01); *B32B 5/02* (2013.01);
(Continued)

(58) Field of Classification Search
None
See application file for complete search history.

(56) References Cited

U.S. PATENT DOCUMENTS 4,013,810 A * 3/1977 Long .................... B29C 70/025
                                                    428/313.9
4,250,136 A * 2/1981 Rex ........................ B29C 70/08
                                                    264/257
(Continued)

FOREIGN PATENT DOCUMENTS

DE   91 00 073 U1    3/1991
FR   2 656 583       7/1991
GB   1 376 155 A    12/1974

OTHER PUBLICATIONS

International Search Report and Written Opinion for corresponding Patent Application No. PCT/GB2016/051718 dated Nov. 28, 2016.

*Primary Examiner* — Shawn Mckinnon
(74) *Attorney, Agent, or Firm* — Renner, Otto, Boisselle & Sklar, LLP

(57) ABSTRACT

The invention relates to a composite sandwich base panel for a Unit Load Device. The panel comprises an upper surface layer comprising fibre reinforcement material, a lower surface layer comprising fibre reinforcement material, and a central core section where at least the majority comprises a plurality of particles bound in a matrix material. The upper surface layer and lower surface layer are provided with a matrix material to bind them to the central core section.

12 Claims, 3 Drawing Sheets

(51) Int. Cl.

| | | |
|---|---|---|
| *B32B 27/06* | (2006.01) | |
| *B32B 5/18* | (2006.01) | |
| *B32B 3/12* | (2006.01) | |
| *B32B 5/02* | (2006.01) | |
| *B32B 5/12* | (2006.01) | |
| *B32B 5/14* | (2006.01) | |
| *B32B 5/24* | (2006.01) | |
| *B32B 27/38* | (2006.01) | |
| *B65D 19/00* | (2006.01) | |
| *B65D 88/14* | (2006.01) | |
| *E04C 2/24* | (2006.01) | |
| *B32B 27/04* | (2006.01) | |
| *B29C 70/66* | (2006.01) | |
| *B32B 7/04* | (2019.01) | |
| *E04C 2/20* | (2006.01) | |
| *B62D 25/20* | (2006.01) | |
| *B32B 5/28* | (2006.01) | |
| *E04C 2/36* | (2006.01) | |

(52) U.S. Cl.
CPC ............... *B32B 5/024* (2013.01); *B32B 5/12* (2013.01); *B32B 5/14* (2013.01); *B32B 5/142* (2013.01); *B32B 5/18* (2013.01); *B32B 5/245* (2013.01); *B32B 5/28* (2013.01); *B32B 7/04* (2013.01); *B32B 27/04* (2013.01); *B32B 27/065* (2013.01); *B32B 27/08* (2013.01); *B32B 27/38* (2013.01); *B62D 25/2054* (2013.01); *B65D 19/0004* (2013.01); *B65D 88/14* (2013.01); *E04C 2/205* (2013.01); *E04C 2/243* (2013.01); *E04C 2/365* (2013.01); *B32B 2250/03* (2013.01); *B32B 2250/04* (2013.01); *B32B 2250/05* (2013.01); *B32B 2250/40* (2013.01); *B32B 2260/023* (2013.01); *B32B 2260/025* (2013.01); *B32B 2260/046* (2013.01); *B32B 2262/101* (2013.01); *B32B 2262/106* (2013.01); *B32B 2264/101* (2013.01); *B32B 2264/102* (2013.01); *B32B 2264/12* (2013.01); *B32B 2266/0271* (2013.01); *B32B 2266/04* (2013.01); *B32B 2266/057* (2016.11); *B32B 2307/536* (2013.01); *B32B 2307/546* (2013.01); *B32B 2307/552* (2013.01); *B32B 2307/558* (2013.01); *B32B 2307/72* (2013.01); *B32B 2439/00* (2013.01); *B32B 2605/18* (2013.01)

(56) References Cited

U.S. PATENT DOCUMENTS

| | | |
|---|---|---|
| 5,773,121 A | 6/1998 | Meteer et al. |
| 2008/0098935 A1* | 5/2008 | Roth et al. |
| 2010/0140839 A1 | 6/2010 | Huber et al. |

* cited by examiner

COMPOSITE SANDWICH STRUCTURE

This application is a national phase of International Application No. PCT/GB2016/051718 filed Jun. 10, 2016 and published in the English language, which claims priority to United Kingdom Patent Application No. 1510082.9 filed Jun. 10, 2015, which are hereby incorporated herein by reference.

FIELD OF THE INVENTION

The invention relates to a lightweight composite sandwich base panel, particularly for use as part of a Unit Load Device.

BACKGROUND TO THE INVENTION

Air cargo is typically transported in, or on, unit load devices that can either be in the form of containers or pallets. As with all aspects of the aviation industry, reducing weight is a key priority as it is synonymous with improved fuel efficiency and lower operating costs. The majority of unit load devices are currently made from high strength aluminium alloys, a legacy from the first designs of the 1960s. An aluminium alloy can offer a suitable combination of cost, density, and manufacturability. However it has two major drawbacks: its stiffness (and strength) to weight ratio and its susceptibility to plastic deformation.

Composite materials, and in particular composite sandwich structures, are known to have high stiffness (and strength) to weight ratios.

U.S. Pat. No. 3,556,448 (Dobbs) discloses a structural panel in which expanded cores of butadiene styrene resin are disposed between flutes or webs of integrally woven three-dimensional cloth. Herein disclosed is a pallet comprising of fibreglass skins that have been hot pressed onto a flat foam core.

U.S. Pat. No. 7,854,204 (Dacus) discloses an ultralight unit load device comprising a ruggedized quadrangular composite structure with a cellular load-bearing core sealed in successive ordered-polymer stiffening plies and trimmed at the outer edges with a hollow, multi-chambered profile of lightweight material fixed with flush attachment means so as to present a flat surface for easy loading and unloading of payloads.

U.S. Pat. No. 8,776,698 (Pherson) discloses an air cargo pallet with a central panel created from a plurality of sandwiched layers, including a foam core disposed between an upper skin layer having a resin and fibre combination and a lower skin layer having a resin and fibre combination. Additionally, the central panel is reinforced with additional fibres extending through the lower skin layer, the foam core and the upper skin layer. An interface layer is disposed around the periphery of the foam core and bonded between the upper skin layer and the lower skin layer to complete the central panel. The pallet is then formed by snap fitting a plurality of rails around the circumference of the central panel by connection to the interface layer.

The above referenced devices address the issue of increasing the stiffness to weight ratio of a unit load device base panel compared with one made from an aluminium alloy. However, they suffer from a different issue that makes them unfit for operation. Unit load devices are moved via roller tracks and ball mats and the base panel of such devices may travel tens of kilometres under load during its lifetime. Low density cores with a corresponding low compressive strength, as are present in the above-mentioned panels, suffer from local indentation failure, which results in them having to be withdrawn from service. It is for this reason that the above inventions are currently not found in service on unit load devices.

SUMMARY OF THE INVENTION

Accordingly, the present invention is directed to a Unit Load Device having a base panel that comprises:
an upper surface layer comprising fibre reinforcement material;
a lower surface layer comprising fibre reinforcement material; and
a central core section where at least the majority comprises a plurality of particles bound in a matrix material,
wherein the upper surface layer and lower surface layer are provided with a matrix material to bind them to the central core section.

The base panel of the Unit Load Device may comprise a composite sandwich structure.

An arrangement such as this provides a lightweight structure that meets the same design load and operational requirements as existing lightweight composite sandwich base panels but has increased resistance to plastic deformation and/or damage formation. A primary operational requirement of a unit load device is for it to be traversed on roller conveyors without permanently deforming and breaking. If the combination of upper and lower surface reinforcement material, and central core section, results in a low flexural stiffness, the panel will excessively bend around the roller tip which will result in fracture of the reinforcement material. Conversely if the core stiffness is too high, then the panel will not bend sufficiently; the contact force will be concentrated over a smaller area resulting in a larger local stress, and thus core failure that manifests as permanent indentation into the panel due to crushing of the core material as a result of the increased stress experienced by the core. Therefore the overall base panel flexural stiffness is one that minimises the probability of either of these failure mechanisms, whilst still being lightweight. The present invention addresses this problem by employing a combination of particles and matrix material within an upper and lower layer of reinforcement material.

The fibre reinforcement may comprise fibres from carbon, aramid, basalt and/or fiberglass, and they can be made from any woven fabric, for example, plain, twill, satin, spread-tow or non-crimp fabrics (NCF) or unidirectional fabrics or any combination thereof.

It is preferable that the particles are predominantly microspheres. The core of the panel comprises high strength microspheres surrounded in a matrix material to form composite foam. This is bound between an upper and lower fibre reinforced surface layer to create a lightweight, rigid, structure. Depending on the choice of microspheres, this can result in a panel with a stiffness to weight ratio that is slightly higher than conventional low density foams core or honeycombs, yet with a much larger compressive strength in the direction normal to the panel surface. Unexpectedly, the core of the unit load device according to the present invention exhibits a compressive strength that is significantly higher—more than double—than the individual compressive strength of either the microspheres or matrix material taken alone, when the microspheres are within the specified size range.

The use of a composite foam within a sandwich construction provides additional benefits, for example, such a sandwich construction is highly resistant to fire and ignition as even when subject to a high temperature, such as a 840 degrees centigrade flame, the unit load device, or sandwich panel thereof, will self-extinguish. Furthermore, the fibres in the composite surface layers constrain the microspheres within the core and prevent molten/burning resin from dripping out of the panel, even under such extreme heat.

Advantageously, the structure of the microspheres is hollow. The use of hollow microspheres further reduces the weight of the panel.

Preferably, the majority of the microspheres have a minimum collapse strength of 40 MPa. Such a collapse strength reduces the risk of plastic deformation that may render the panel unusable.

In one embodiment, the majority of the microspheres have a diameter of less than 40 µm, in one arrangement a diameter of less than 30 µm and, in some embodiments, a diameter of less than 20 µm.

In a particularly advantageous arrangement, the matrix material binding the fibres in the upper and lower surface layers, the matrix material bonding the upper and lower surface layers to the core, and the matrix material binding the particles in the central core, is the same and continuous therewith. This creates a single matrix phase structure. The use of a single matrix material in the form of a single matrix phase reduces the risk of the outer layers of the panel separating and creates a strong bond throughout the whole of the panel. The fibre reinforcement and the particles in the core may be impregnated together with such matrix material prior to curing the arrangement. Alternatively the matrix material may be the same and continuous therewith only between the matrix material binding the fibres in the upper and lower surface layers and the matrix material bonding the upper and lower surface layers to the core, or the same and continuous therewith only between the matrix material bonding the upper and lower surface layers to the core and the matrix material binding the particles in the central core.

Preferably, the thickness of the upper surface layer and/or the lower surface layer is between 0.2 mm and 3.5 mm. Such a thickness provides a lightweight and strong outer surface to the panel.

Advantageously, the density of the central core section is between 0.5 and 1.2 g/cm³. This creates a lightweight panel that has sufficient strength to resist indentation, when in use.

In one arrangement, the central core section comprises a cellular structure and, preferably, the cellular structure is an open cell structure and it is at least partially filled with the particles. The cellular structure may be in the form of a honeycomb structure, which could be comprised of an aluminium alloy or a composite material reinforced with glass or aramid fibres, and arranged in any packing shape. Two additional structural benefits are achieved when using a cellular structure. The first is that the durability of the panel is greater than that of a composite foam core without the honeycomb. Panels with a cellular structure incorporated in the core unexpectedly demonstrate a higher resistance to crack propagation when being traversed on the roller conveyors. Secondly, depending on the manufacturing process, the panel that is produced has a flatter surface finish with a more uniform thickness distribution. Stiffness and strength of fibre-reinforced composites are directly affected by fibre alignment, so a flatter surface results in less variability in these properties. This results in fewer weak spots on the panel which increases the durability of the panel.

In a preferred arrangement, a barrier layer is arranged between the central core section and at least one surface layer. Employing a barrier layer between the central core section and the surface layers reduces the risk of migration of the particles from the core section into the outer layers. The barrier layer may comprise lightweight veils, cloths, paper, or any material that is permeable to liquid, particularly the matrix material, but is impermeable to particles of the core.

In a further arrangement, the central core section comprises a plurality of different particles and those particles may differ according to one or more characteristics selected from a group comprising: size; shape structure; and material.

Additional particles may be incorporated with different size scales to the microspheres which may improve the overall performance of the core, specifically the fracture toughness of the material. Nano-scale particles may be introduced as solid particles, such as silica particles in the size range of 10-200 nm. Alternatively, or additionally, block copolymers may be dissolved within the resin such that upon the solidification of the resin the block copolymers cease to be soluble, so the resin solution decomposes to discrete phases where the block copolymers self-assemble into particles and/or into a co-continuous network.

Preferably, the particles themselves may comprise between 30% and 74% of the core, by volume and, more preferably, the particles themselves may comprise between 50% and 70% of the core, by volume. It is preferred that the majority of the core comprises of particles held within the matrix material in order to provide a balance between the strength and weight of the core.

In an advantageous construction, the structure of the core varies over its volume so that at least two parts of the core structure have different structural characteristics. By varying the structure of the core over its volume, the strength and other structural characteristics can be altered locally. This may be particularly desirable where further parts are to be attached to, or incorporated into, the panel, for example by means of rivets or bolted joints. The distance from the edge of the panel where the core structure is varied may be around 40 mm, although this distance may vary between 0% and 25% of the maximum length of the panel.

Advantageously, at the edge of the panel the structure of the core may be changed such that the particles are substantially replaced with other materials, such as short fibre reinforcement. The short fibre reinforcement may replace at least some, or all, the particles in the core such that short fibre reinforcement themselves may comprise between 0% and 40% of the core, by volume.

In another embodiment, at the edge of the panel the structure of core may be changed such that the composite foam is replaced with reinforcement material arranged between the two surface layers (but may extend beyond the edge of the panel). The reinforcement material may comprise of a solid composite laminate, aluminium alloy, steel, other metal, alloy, or plastic. Providing strips of reinforcement allows the strength and stiffness of the panel to be adjusted locally.

The panel of the present invention, particularly one provided with reinforcement material, is used as a base panel in a unit load device or it may be substituted in place of an existing base panel, and thereby be mechanically fastened to an existing unit load device. Whilst composite sandwich structures are relatively poor at withstanding fastener joint loads, the use of a region peripheral to the central core, wherein the material composition and/or the geometry is altered, allows the panel to be more resistant to forces exerted at such joints.

To that end, at least part of the periphery of the panel may be recessed or raised to create a lip portion. By creating a lip portion, external edge components may be fitted and fastened to a panel in a predetermined position, whilst using fasteners other than the countersunk type. If the external edge components are placed beneath the recessed portion of the panel, then the joint is advantageously in a compressive load state rather than a crack opening tensile state.

It is preferable that the base panel of the unit load device is a lightweight composite sandwich panel as herein described. The composite foam and lightweight fibre reinforced surface layer result in a panel that can weigh up to 60% less than an equivalent aluminium alloy unit load device base panel for an AKE type unit load device. A unit load device in accordance with the present invention is more resistant to the high compressive loads and resulting contact stresses that arise during operation.

Advantageously, a wear layer may be attached to at least one surface. An aramid, polyamide, polyethylene, or similar high wear-resistant material may be placed on the outside of the upper and/or lower reinforcement layers.

A plurality of edge rails may be positioned around at least part of the periphery of the panel. These rails may connect the panel to the rest of the unit load device. The material and/or geometry of the panel and/or unit load device may be changed in order that the panel does not fail.

Preferably, the edge rails of the unit load device may be joined by adhesive. The use of adhesive provides a bond between the edge rail and the base of the unit load device without puncturing the outer layer of the panel.

The core consists of low density composite foam made from high strength microspheres surrounded in a matrix material. Alterations to the material composition and/or geometry in the peripheral regions facilitate the panel to be joined to edge components.

The invention extends to a method of making a unit load device in accordance with the present invention.

The present invention may be made by employing the steps of:
  providing a lower surface layer on a surface, wherein the base lay-up comprises a first reinforcement material layer;
  providing a core layer on to the base lay-up, wherein the core layer, which may comprise an open cellular structure, and having that core layer at least partially filled with unbound particles;
  providing an upper surface layer on top of the core layer, wherein the top lay-up comprises a second reinforcement material layer;
  sealing the arrangement within a hermetically sealed enclosure, wherein the enclosure is provided with at least one conduit to allow fluid communication with the inside of the enclosure;
  introducing matrix material into the arrangement via a pressure differential; and
  curing the matrix material.

The conduit(s) may be positioned above or below the arrangement and passes through the enclosure to allow air to be removed from the enclosure to create the pressure differential. Additionally, or alternatively, the matrix material may enter the enclosure through one or more conduits. Additives and other elements may be added to the arrangement before it is sealed within the enclosure.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
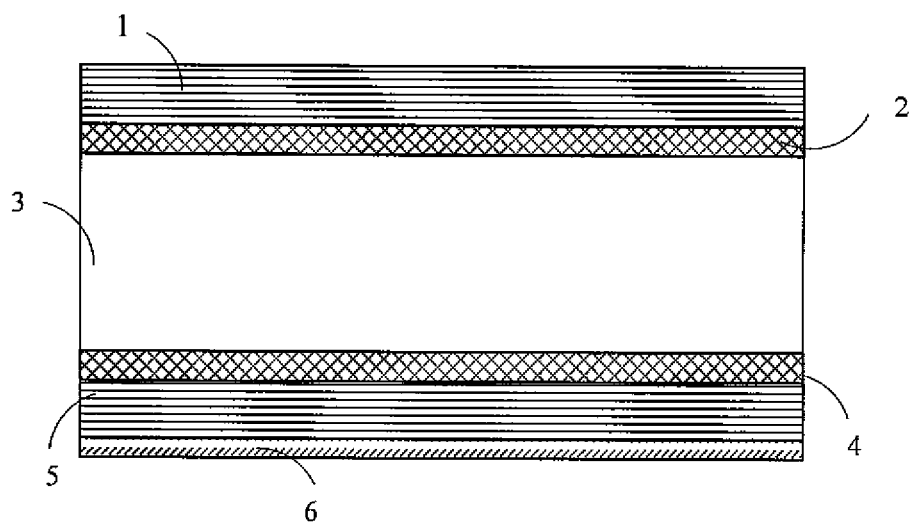
FIG. 1 is a diagrammatic illustration of a vertical cross section of a panel according to the present invention.

FIG. 1 shows a composite sandwich base panel comprising an upper surface layer 1, and lower surface layer 5, which sandwiches a composite foam core 3. Either side of the core is a barrier layer, 2 and 4. The entire panel is then surrounded by a plurality of external edge components (not shown). For the regions where the edge component will be attached to the panel, there may be a change in the local material composition of the composite core 3, and/or a change in the local geometry of the peripheral region. A wear layer 6 may be bonded to the lower surface layer 5.

Figure 2A:
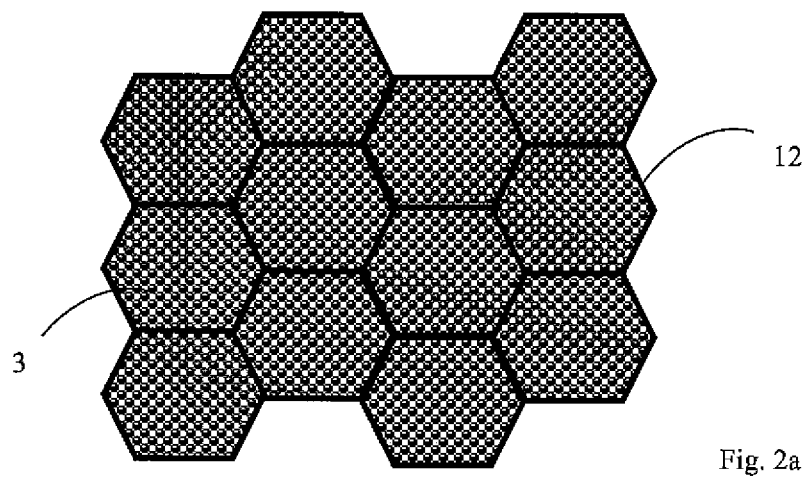
FIG. 2A is a diagrammatic illustration of a horizontal cross section of a panel according to the present invention.
Figure 2B:
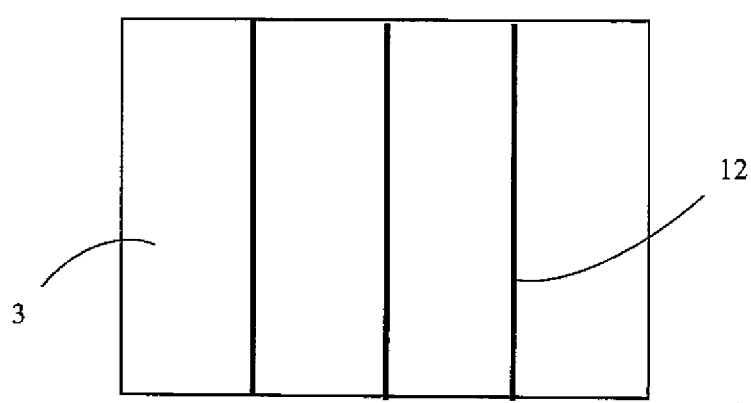
FIG. 2B is a diagrammatic illustration of a vertical cross section of a panel according to the present invention.

Depending on the manufacturing process used, some embodiments of the invention include a cellular structure incorporated into the composite foam 3. FIG. 2A is a horizontal cross section of a hexagonal cellular structure, 12, that is incorporated into the composite foam core 3 and FIG. 2B is a vertical cross section of a hexagonal cellular structure, 12, that is incorporated into the composite foam core 3. Similarly, the manufacturing method used may mean that the barrier layer 2 in between the core and the top skin, and/or the barrier layer 4 in between the core and the bottom skin layer, does not need to be included. Finally some embodiments of the invention may omit the wear layer 6.

The composite foam core 3 is made from a matrix material that contains lightweight hollow glass microspheres. The majority of the microspheres have a diameter equal to or less than 40 μm, preferably in the range of 9-25 μm, and/or a collapse strength greater than 40 MPa. The composite foam core 3 comprises 50-70% by volume of microspheres, surrounded by an epoxy resin matrix material.

The present invention may employ carbon fibre reinforced epoxy in a 0°/90°/±45° layup for the skins, though other layups may be used. Clearly, the angled layup can be used with other materials.

Figure 3:
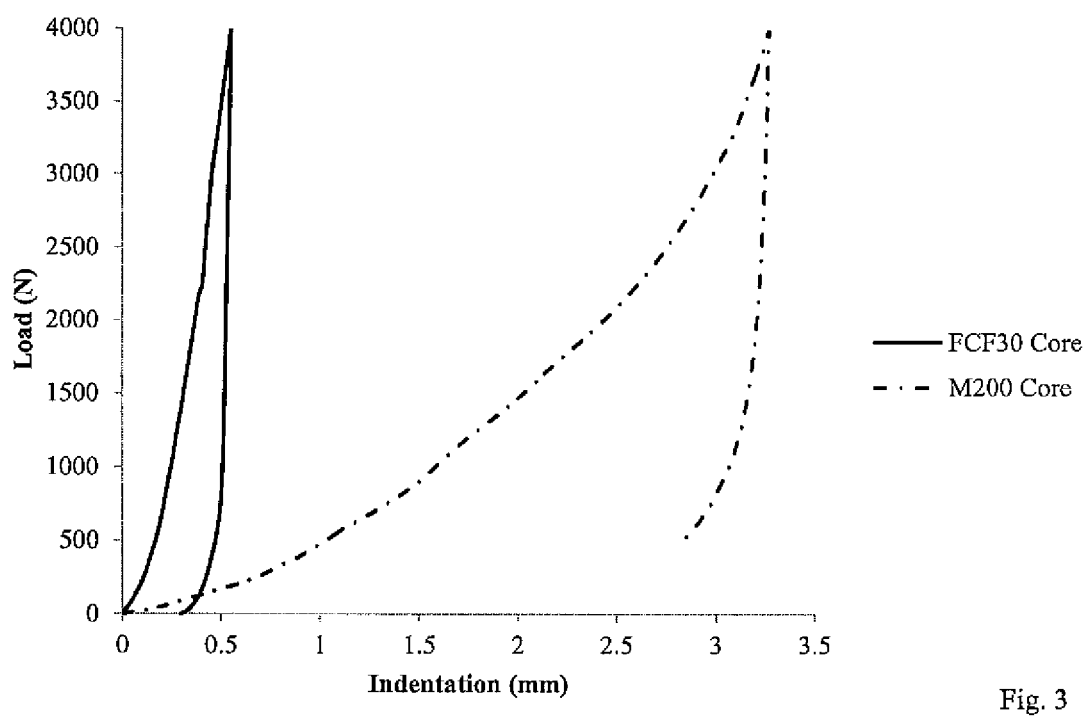
FIG. 3 is graph showing deformation of two panels.

IATA regulations state that indentation tests shall be performed on the base of all unit load devices. FIG. 3 shows the results of a static indentation test, comparing such forces experienced upon a panel in accordance with the present invention (FCF30) and a panel constructed from a conventional high strength foam core (Gurit® M200). Both panels had the same core thickness, surface layer material, and surface layer thickness. The load condition was replicated by a spherical steel ball, which is normally used in aircraft cargo flooring, being forced into the panel by an Instron® 5585H material testing machine. The results of this test are shown in the graph of FIG. 3. As can be seen, for the same load, the maximum indentation of the panel made from a conventional foam core is more than six times larger than the present invention; the conventional foam core panel will plastically deform and therefore be difficult to unload from the aircraft, whilst the panel in accordance with the present invention exhibits significantly less deformation and thus will be easier to unload.

Figure 4:
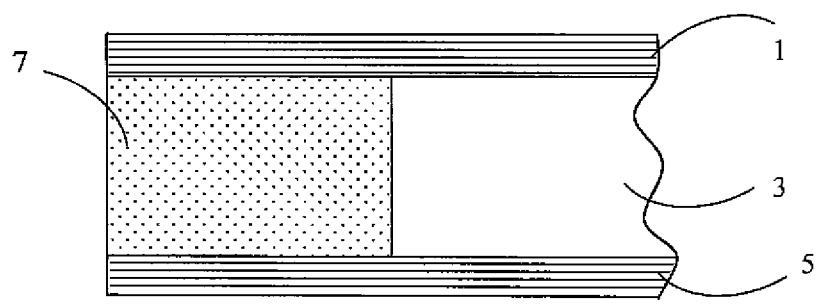
FIG. 4 is a diagrammatic illustration of a vertical cross section of a second panel according to the present invention.

As shown in FIG. 4, in one embodiment, the composition of the composite foam at the periphery of the panel is such that the microspheres decreases to 0%, and is then replaced by a short fibre reinforcement 7 that comprises of up to 40% by volume of the composite foam. Such an embodiment uses milled carbon fibre reinforcement with an average fibre length of 100 µm in, however, short fibres may be carbon, aramid, basalt and/or fiberglass fibres. In order to facilitate the change in composition from the central panel core to the peripheral, the peripheral region may contain a cellular honeycomb. This partitions the locally changed core material from the rest of the central composite foam core. Alternatively, the short fibre reinforcement may be placed only in the central core, or it may be used in both the core and the peripheral edge region.

Figure 5:
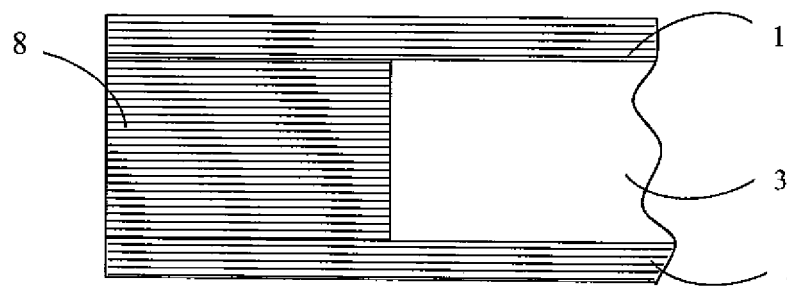
FIG. 5 is a diagrammatic illustration of a vertical cross section of a third panel according to the present invention.

In another embodiment, as shown in FIG. 5, part of the composite foam core may be replaced, in part, with a different material. For example, strips of reinforcement material may be placed in the peripheral edge region such that, locally, the structure is a solid composite laminate, 8. Alternatively solid metallic or non-metallic materials may be used. The reinforcement material is arranged between the surface layers, but may extend beyond the edge of the panel.

Figure 6:
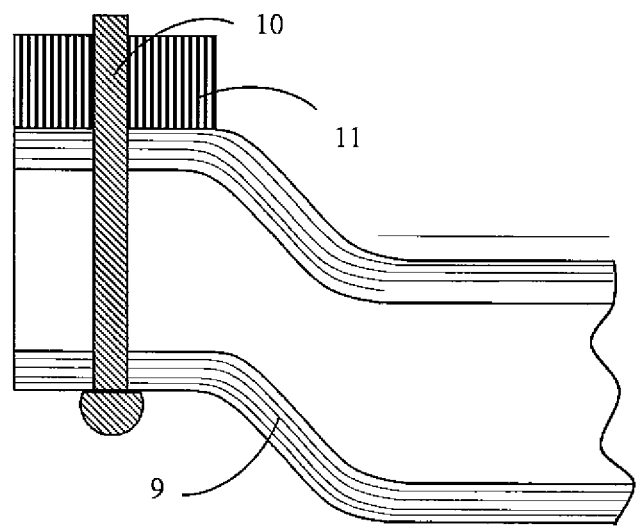
FIG. 6 is a diagrammatic illustration of a vertical cross section of a fourth panel according to the present invention.
Figure 7:
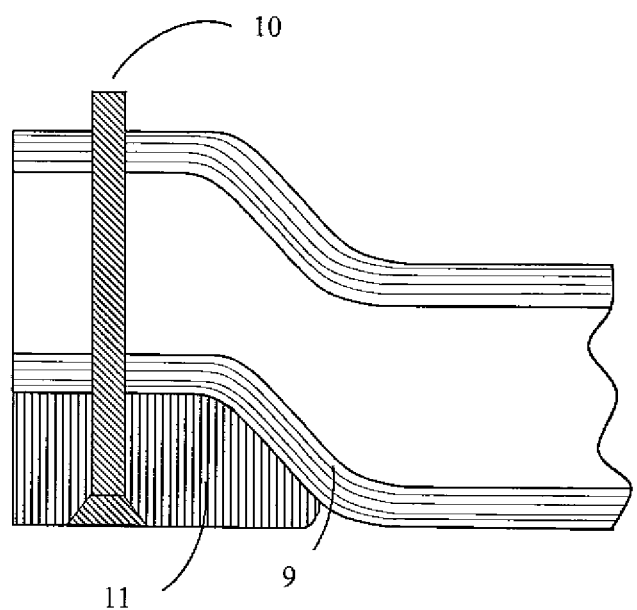
FIG. 7 is a diagrammatic illustration of a vertical cross section of a fifth panel according to the present invention.

FIG. 6 shows a further embodiment wherein the edge geometry of the panel is altered. The panel may be recessed on the top and/or bottom surface, 9 in order to allow the central portion of the panel to remain flat when in contact with the ground, such that protruding head fasteners 10 may be used, instead of the countersunk type, to connect the external edge component 11 to the panel. Alternatively, FIG. 7 shows an arrangement with the external edge component placed beneath the recessed portion of the panel. This advantageously puts the joint in a compressive load state rather than a crack opening tensile state. In both arrangements a 'tea-tray' lip around the edge of the panel is created, which increases the effective stiffness of the panel. The altered edge geometry may also be used in combination with those shown in FIGS. 1, 3, and 4, such that the core may feature a change in its composition or be replaced by a different material.

Additional advantages from the use of composite foam are also evident when a curved edge geometry, 9, is used. Under operational loads with such geometry, large through thickness stresses can develop that would lead to the break down and failure of conventional, polymeric foams. The increased stiffness and strength attainable with the composite foam allows such loads to be sustained, which then enables more efficient joints between the panel and remainder of the unit load device.

A further embodiment of a unit load device employs a panel comprising an edge joining region that employs adhesives rather than mechanical fasteners. Adhesive bonds eliminate the need to drill any holes in the composite sandwich panel, thus increasing the structural integrity of the panel. The adhesives may be applied in a similar way to that of a weld; either continuously along the perimeter of the panel or in discrete spots.

In other embodiments of the present invention, the composite foam, which comprises more than 50% of the central core structure, comprises micron scale microspheres that are as little as 30% of the core, by volume, up to a maximum of 74%, by volume. The microspheres may be solid or hollow, or made from glass, carbon, metal, polymer or ceramic materials.

Depending upon the requirement for the panel, thermoset or thermoplastic resins could be used for the matrix, for example: vinyl ester, acrylic or PEEK. Additionally, the matrix may include chemical additives, for example a flame retardant, toughening agent and/or UV resistance.

In the preferred embodiment, the core may have an average thickness of about 2.8 mm, such that the total panel thickness is about 4 mm. However, the core thickness may be between 1 mm and 8 mm, depending on the application.

One or more features of one embodiment of the present invention may be used in combination with, or as an alternative to, one or more features of the present invention.

The invention claimed is:

1. A unit load device having a base panel that comprises:
   an upper surface layer comprising fibre reinforcement material;
   a lower surface layer comprising fibre reinforcement material; and
   a central core section wherein the majority of the central core section comprises a plurality of microspheres bound in a matrix material;
   wherein the upper surface layer and lower surface layer are provided with a matrix material to bind them to the central core section; and
   wherein the majority of the microspheres have a diameter of less than 40 µm;
   wherein the lower surface layer is disposed at a bottom side of the unit load device; and
   wherein the core section comprises a cellular structure which is at least partially filled with the microspheres.

2. The unit load device according to claim 1, wherein the majority of the microspheres have a minimum collapse strength of 40 MPa.

3. The unit load device according to claim 1, wherein the matrix material in the upper and lower surface layers, the matrix material bonding the upper and lower surface layers, and the matrix material binding the microspheres in the central core, is the same and continuous therewith.

4. The unit load device according to claim 1, wherein the thickness of the upper surface layer and/or the lower surface layer is between 0.2 mm and 3.5 mm.

5. The unit load device according to claim 1, wherein the density of the majority of the core is between 0.5 and 1.2 g/cm3.

6. The unit load device according to claim 1, wherein a barrier layer is arranged between the core section and at least one surface layer.

7. The unit load device according to claim 1, wherein the core section comprises a plurality of different microspheres, wherein the microspheres differ according to one or more characteristics selected from a group comprising: size; shape; structure; and material.

8. The unit load device according to claim 1, wherein more than 50% of the central core section structure comprises composite foam where the microspheres constitute between 30% and 74% of the core, by volume.

9. The unit load device according to claim 1, wherein the structure and/or composition of the core varies over its volume such that at least two parts of the core structure have different structural characteristics.

10. The unit load device according to claim 1, wherein the panel comprises strips of reinforcement material arranged between the two surface layers.

11. The unit load device according to claim 9, wherein at least one region of the core of the panel comprises a composite incorporating short fibre reinforcement from 0% to 40% by volume.

12. The unit load device according to claim 1, wherein at least part of the periphery of the panel is recessed or raised to create a lip portion.

\* \* \* \* \*